United States Patent [19]

Keefer

[11] Patent Number: 4,801,308
[45] Date of Patent: Jan. 31, 1989

[54] APPARATUS AND PROCESS FOR PRESSURE SWING ADSORPTION SEPARATION

[76] Inventor: Bowie G. Keefer, 4324 W. 11th Ave., Vancouver B.C., Canada, V6R 2M1

[21] Appl. No.: 929,438

[22] Filed: Nov. 12, 1986

Related U.S. Application Data

[63] Continuation-in-part of Ser. No. 866,395, May 23, 1986, Pat. No. 4,702,903, which is a continuation-in-part of Ser. No. 538,370, Oct. 3, 1983, abandoned.

[51] Int. Cl.$^4$ ............................................. B01D 53/04
[52] U.S. Cl. ........................................... 55/25; 55/28; 55/68; 55/180; 55/208; 55/390; 60/649; 60/673; 422/217; 423/659
[58] Field of Search ...................... 55/25, 28, 68, 180, 55/208, 390; 60/649, 673

[56] References Cited

U.S. PATENT DOCUMENTS

| | | | |
|---|---|---|---|
| 3,141,748 | 7/1964 | Hoke et al. | 55/58 |
| 3,149,934 | 9/1964 | Martin | 55/58 |
| 3,323,288 | 6/1967 | Cheung et al. | 55/58 |
| 3,370,420 | 2/1968 | Johnson | 60/649 |
| 3,504,494 | 4/1970 | Winsche | 60/649 |
| 3,568,438 | 3/1971 | Meienberg | 60/673 |
| 3,838,553 | 10/1974 | Doherty | 55/58 |
| 3,871,179 | 3/1975 | Bland | 60/649 |
| 4,070,164 | 1/1978 | Miwa et al. | 55/58 |
| 4,161,210 | 7/1979 | Reid et al. | 60/673 |
| 4,198,827 | 4/1980 | Terry et al. | 60/649 |
| 4,280,824 | 7/1981 | Lassmann et al. | 55/58 |
| 4,340,398 | 7/1982 | Doshi et al. | 55/58 |
| 4,359,328 | 11/1982 | Wilson | 55/58 |

Primary Examiner—John Doll
Assistant Examiner—Wayne A. Langel

[57] ABSTRACT

Pressure swing adsorption separation of a gas mixture containing a more readily adsorbed component and a less readily adsorbed component is performed within an apparatus containing an adsorbent bed with cyclically varied geometry, such that the bed volume can be expanded or contracted. Variable volume displacement means at either end of a flow path through the adsorbent bed are operated cyclically to generate flow of a gas mixture along the flow path, in a first direction when the more readily adsorbed component is preferentially adsorbed during the high pressure portion of the cycle while the bed volume is relatively contracted, and in a second reverse direction during the low pressure portion of the cycle while the bed volume is relatively expanded. The apparatus separates the gas mixture and also converts thermal energy by a thermodynamic cycle, such that heat and the more readily adsorbed component are transported in the second direction, while the less readily adsorbed component is transported in the first direction. Adsorbent bed volume is contracted while pressure is rising, and expanded while pressure is reducing, thus minimizing flow along the flow path except when the more readily adsorbed component is maximally or minimally adsorbed, and consequently improving performance of the pressure swing adsorption cycle.

41 Claims, 9 Drawing Sheets

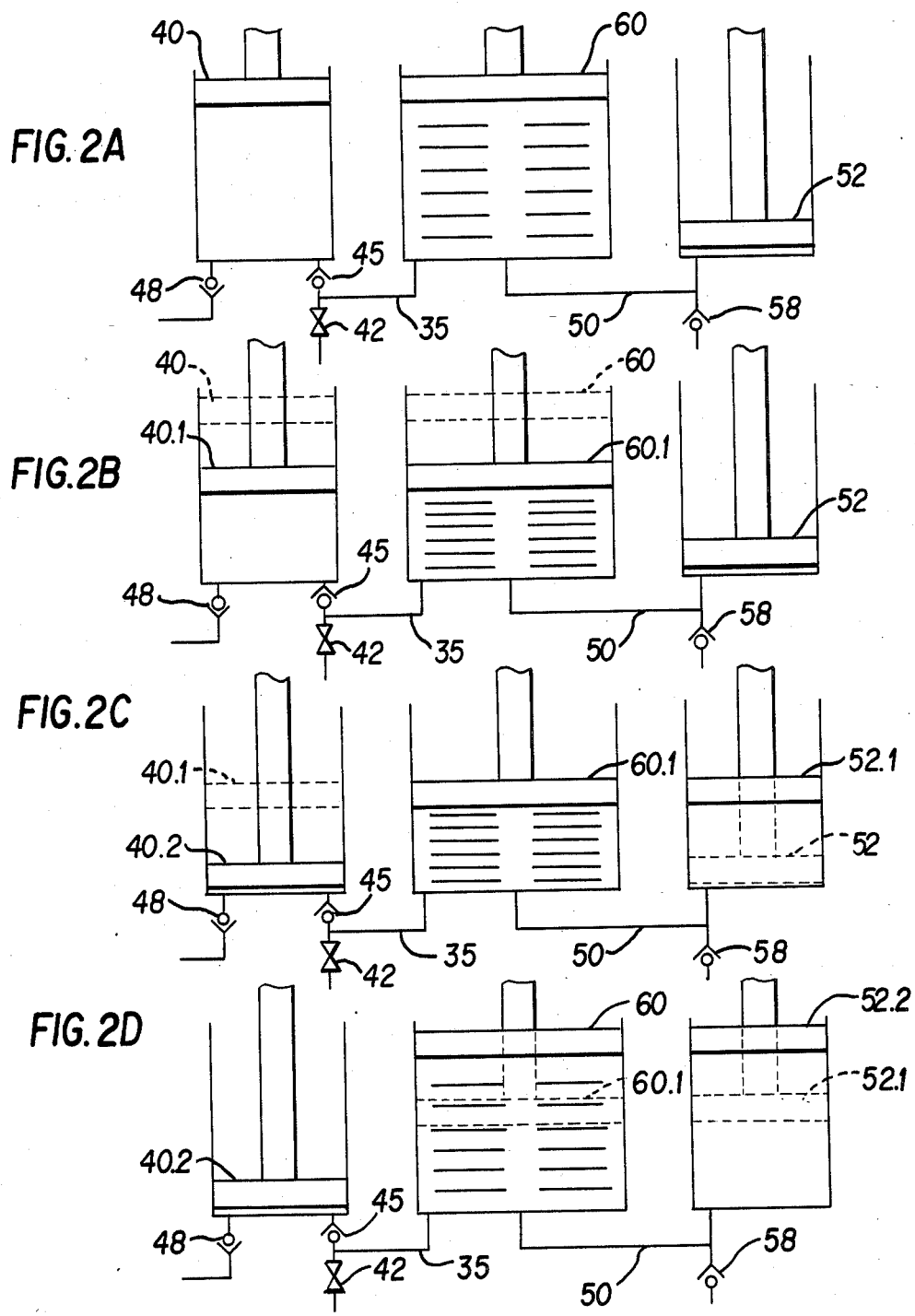

APPARATUS AND PROCESS FOR PRESSURE SWING ADSORPTION SEPARATION

BACKGROUND OF THE INVENTION

1. Field of the Invention

The invention relates to separations conducted in the gas or vapour phase. In some embodiments, the separation is conducted simultaneously with waste heat recovery, refrigeration or heat pumping. The invention may be applied to air separation and numerous other gas separation or purification processes.

This application is a continuation-in-part of my co-pending U.S. patent application Ser. No. 06/866,395 filed 5-23-86, now Pat. No. 4,702,903, which is a continuation-in-part of Ser. No. 06/538,370 filed 10-3-83, abandoned.

2. Prior Art

Gas separation by pressure swing adsorption is achieved by cyclically reversing flow of a gas mixture over an adsorbent bed which preferentially adsorbs a more readily adsorbed component relative to a less readily adsorbed component of the mixture. The total pressure is elevated during intervals of flow in a first direction through the adsorbent bed, and is reduced during alternating intervals of flow in the reverse direction. According to the well known parametric pumping principle, the less readily adsorbed component tends to migrate in the first direction over complete cycles, while the more readily adsorbed component tends to migrate in the reverse direction, thus achieving separation.

In the idealized parametric pumping concept, a more readily sorbed component of a fluid mixture is cyclically immobilized and liberated on a fixed bed by preferential sorption and desorption caused by cyclic modulation of an external parameter, which in general may be pressure, temperature, pH or other adjustable parameter. When the parameter is adjusted to maximize sorption loading of the more readily sorbed component on the bed, the fluid contacting the bed is made to flow in a first direction through the bed. During alternating intervals when the parameter is adjusted to minimize sorption loading of the more readily sorbed component on the bed, the fluid is made to flow in the reverse direction along the same flow path in the bed. Over complete cycles, the less readily sorbed fraction of the mixture tends to migrate in the first direction, while the more readily sorbed component tends to migrate in the reverse direction, thus achieving separation. In the ideal parametric pumping concept, there is essentially no flow along the flow path in the bed except when sorption of the more readily component is maximized or minimized. An example of the parametric pumping for liquid phase separation using temperature as the parameter was described by Wilhelm et al (R.H. Wilhelm, A.W. Rice and A.R. Bendelius, Ind. Eng. Chem. Fundamentals 5, 141, (1966)). When the parameter is pressure and the fluid mixture is compressible as in pressure swing adsorption, there must be flow in the fixed adsorbent bed while the pressure is changing, causing large departures from an ideal parametric pumping process. Because flow in the adsorbent bed cannot be suppressed at intermediate pressures between the maximum and minimum limits, prior art pressure swing adsorption processes for gas separation have failed to approach ideal separation performance and efficiency.

The conventional process for gas separation by pressure swing adsorption uses two or more adsorbent beds with directional valving to control the flow of compressed feed gas over each bed in alternating sequence, while the other bed is purged at low pressure by the reverse flow of a portion of the product gas, which is the less readily adsorbed component. While this less readily adsorbed fraction can be highly purified, the more readily adsorbed fraction cannot be totally purified because of mixing with the less readily adsorbed component in the purge gas, and recovery of the less readily adsorbed product is incomplete. This conventional process makes inefficient use of mechanical energy, because the compression energy of the feed gas is largely dissipated during expansion processes. Another common name for the pressure swing adsorption separation process is "heatless adsorption", which seems to deny the possibility of beneficial effects by thermal coupling to a regenerative thermodynamic cycle to improve pressure swing adsorption apparatus as disclosed in the present invention.

Some secondary and adverse thermal effects do arise in operation of conventional pressure swing adsorption gas separation apparatus, particularly those using large adsorption beds with poor heat exchange to ambient. The adverse effects include cyclic release and take-up of the latent heat of adsorption, causing a temperature swing of the adsorbent bed acting in opposition to the pressure swing, and in larger beds also leading ot detrimental radial temperature gradients.

As mentioned above, the usual pressure swing adsorption cycle has the performance limitations that the more readily adsorbed component cannot be purified completely (because of mixing with the purge), and therefore the less readily adsorbed component of the feed mixture cannot be recovered completely. Hence, a conventional pressure swing adsorption system used to recover hydrogen from the purge stream of an ammonia plant could deliver highly pure hydrogen, but cannot recover all the hydrogen.

A conventional pressure swing adsorption plant applied to air separation cannot deliver oxygen with purity greater than about 95%, because argon is concentrated with oxygen in the less readily adsorbed fraction over zeolite molecular sieves, on which nitrogen is the more readily adsorbed component based on equilibrium selectivity. An alternative air separation cycle based on kinetic selectivity over carbon molecular sieves or tight pore zeolites can deliver highly pure inert gas since nitrogen and argon form the less readily adsorbed component, but can only achieve a limited enrichment of oxygen which is the more readily adsorbed component in this case. There is a need for an improved pressure swing adsorption process which can deliver oxygen of at least 99% purity.

The more general object of adapting pressure swing adsorption to achieve substantially complete fractionation of a binary mixture has been addressed in U.S. Pat. No. 3,149,934 (Martin) and U.S. Pat. No. 4,354,859 (Keller et al). In these inventions, the feed mixture is injected between the ends of each adsorbent bed, the pressure and flow regime is coordinated to concentrate the more readily adsorbed component to one end and the less readily adsorbed component to the other end of the bed, and the more readily adsorbed component is refluxed into its end of the bed during the high pressure phase of the cycle while the less readily adsorbed component is refluxed into the other end during the low pressure end of the cycle. With reflux at both ends of the bed, it becomes possible in principle to produce both components with high purity and recovery. In the conventional cycle, only the less readily adsorbed component is refluxed during purge, resulting in the inability to purify both components of the binary mixture. It may be noted that an inverted cycle has been disclosd in U.S. Pat. No. 4,359,328 (Wilson), which has a high pressure reflux of the more readily adsorbed fraction (but no low pressure purge, improving purification of the more readily adsorbed fraction but losing the full ability to purify the less readily adsorbed fraction.

The Keller patent is also of interest because it achieves the coordination of total pressure and flows in the adsorbent bed through the use of pistons or other mechanical volume displacement means at both ends of the bed. The pistons are specified to have unequal displacements. The cyclic flow and pressure regime is generated by reciprocating the pistons at a suitable periodic frequency, and with a specified range of phase angles between them such that a two component mixture can be separated to a high extent.

None of the above cited references contemplates the direct coupling of a pressure swing adsorption separation process to a regenerating thermodynamic cycle as in the present invention. The prior art does not anticipate use of a variable geometry adsorbent bed with cyclically varied volume to compensate the compressibility effects which have prevented close approach of pressure swing adsorption processes to the parametric pumping ideal.

SUMMARY OF THE INVENTION

The invention improves separation performance and efficiency by coupling the pressure swing adsorption process to a regenerative thermodynamic cycle using the feed mixture and its separated fractions as working fluid. The thermodynamic cycle is related to the normally closed Ericsson cycle, which is in turn related to the Stirling cycle. The apparatus contains an adsorbent bed which also functions as a thermal regenerator, and associated cyclically operated flow generation means at each end of a flow path through the adsorbent bed. The flow generation means at least one end of the flow path will include a cyclic variable volume displacement means. The pressure swing adsorption cycle and the thermodynamic cycle may be optimized by cyclically varying the volume of the adsorbent bed, at the same periodic frequency as cyclic operation of the two flow generation means at each end of the flow path through the adsorbent bed, with phase relationships coordinated such that flow through the adsorbent bed is minimized except when pressure driven adsorption of a more readily adsorbed component is substantially maximal or minimal.

The adsorbent bed comprises adsorbent material disposed along a gas flow path. In this specification, the term adsorbent will be used generally to describe any suitably selective sorbent material which can be immobilized on a solid support or packed in a bed of solid particles. Thus, the "adsorbent" may be a microporous solid adsorbent, or may equivalently be a porous solid material impregnated with an absorbent liquid.

For separation of a particular feed gas mixture according to this invention, a suitable adsorbent material will preferentially adsorb a first more readily adsorbed component of the gas mixture relative to a second less readily adsorbed component of the gas mixture, in response to increase of pressure. Conversely, the first component will be preferentially desorbed by the adsorbent in response to decrease of pressure. The selectivity of the adsorbent for the first component relative to the second component may be based on preferential equilibrium sorption, or on preferential rate of sorption. When the separation process is based on preferential equilibrium sorption, the preferential adsorption and desorption of the first component will be in phase with pressure variations if the process is conducted at a sufficiently slow cycle rate. At faster cycle rates, and when the separation process is based kinetically on preferential rate of adsorption of the first component, i.e. on faster diffusion of the first component, diffusion rate limitations will cause some lag in the response of preferential adsorption and desorption of the first component to gas phase pressure variations.

The flow path through the adsorbent bed will in general comprise a multiplicity of flow channels in parallel. A longitudinal direction is defined along the flow channels in the direction of flow in the flow path, and a transverse direction is defined in a direction orthogonal to the flow channels. The adsorbent bed may be nonuniform in the longitudinal direction, but the flow channels should be substantially identical to ensure that longitudinal dispersion of concentration wavefronts in the flow path is minimized. A flow path volume of the adsorbent bed is defined which is equivalent to total voidage volume of the bed, and includes the flow channels and the porosity of the adsorbent material. In the present invention, flow path volume of the adsorbent bed may be varied cyclically, in order to minimize flow in the flow path except when the preferential adsorption of the first component in response to pressure changes is substantially maximal or minimal. Consistent with the requirement that the flow channels be substantially identical at each instant, the flow path volume of the bed may be varied in parallel by varying the transverse width of the flow channels, or in series by opening and closing variable volumes between longitudinal segments of the bed.

An adsorbent bed with flow channels whose transverse width may be varied can be realized as a stack of adsorbent plates separated by gaps. The adsorbent plates may be fabricated from solid adsorbent material, or from inert support material to which adsorbent material is attached. The gaps define the flow channels, which can be varied in width by varying the spacing of the adsorbent plates. The minimum width (corresponding to high pressure intervals) is controlled by stops which prevent complete collapse of the gaps, while the maximum width (corresponding to low pressure intervals) may be controlled by tensile links between adjacent pairs of plates. The width of the flow channels between the plates may be cyclically varied by a mechanical actuator means actuating on individual plates or on the entire stack, by an externally applied force, or by variations of internal pressure. The adsorbent plates may conveniently be configured as annular discs, with radial flow passages connecting at inner and outer radii to the flow generation means.

Alternatively, variable flow path volume within the adsorbent bed may be achieved by varying the volume of spaces in series between longitudinal segments of the bed. The bed comprises a number of segments along its flow path. In a simple embodiment, these segments can be moved relatively in the longitudinal directions, opening taps between the segments when pressure is decreasing, and closing those gaps when pressure is increasing. The segments are porous or perforated in the longitudinal direction in order to provide the flow path through the adsorbent bed, and bellows or other sealing means is provided between the segments to confine the flow to that flow path.

Superior performance may be provided by the adsorbent bed comprising a multiplicity of adsorbent plates with closely identical gaps defining parallel flow passages, since this configuration can achieve lower longitudinal dispersion and pressure drop compared to a simple packed bed of adsorbent pellets. However, the gap spacing must be closely controlled, particularly when the bed is in its contracted position with minimum channel width. The alternative adsorbent bed configuration with multiple segments in series has the advantage that the relative expansion and contraction of the spaces between the segments need not be critically coordinated, but the disadvantage that the concentration wavefront will be smeared during the low pressure flow interval by the expanded spaces between the segments, acting as mixing chambers at intervals along the flow path.

DESCRIPTION OF THE DRAWINGS

FIGS. 2A, 2B, 2C and 2D show the apparatus of FIG. 1 in four positions corresponding to the stages of a complete cycle. In FIG. 2A, the apparatus has completed a low pressure flow interval, and is about to enter a compression interval. In FIG. 2B, the apparatus has completed the compression interval, and is about to enter a high pressure flow interval. In FIG. 2C, the apparatus has completed the high pressure flow interval, and is about to enter an expansion interval. In FIG. 2D, the apparatus has completed the expansion interval, and is about to enter the next low pressure flow interval returning to the configuration of FIG. 2A.

DETAILED DISCLOSURE

FIG. 1

Figure 1:
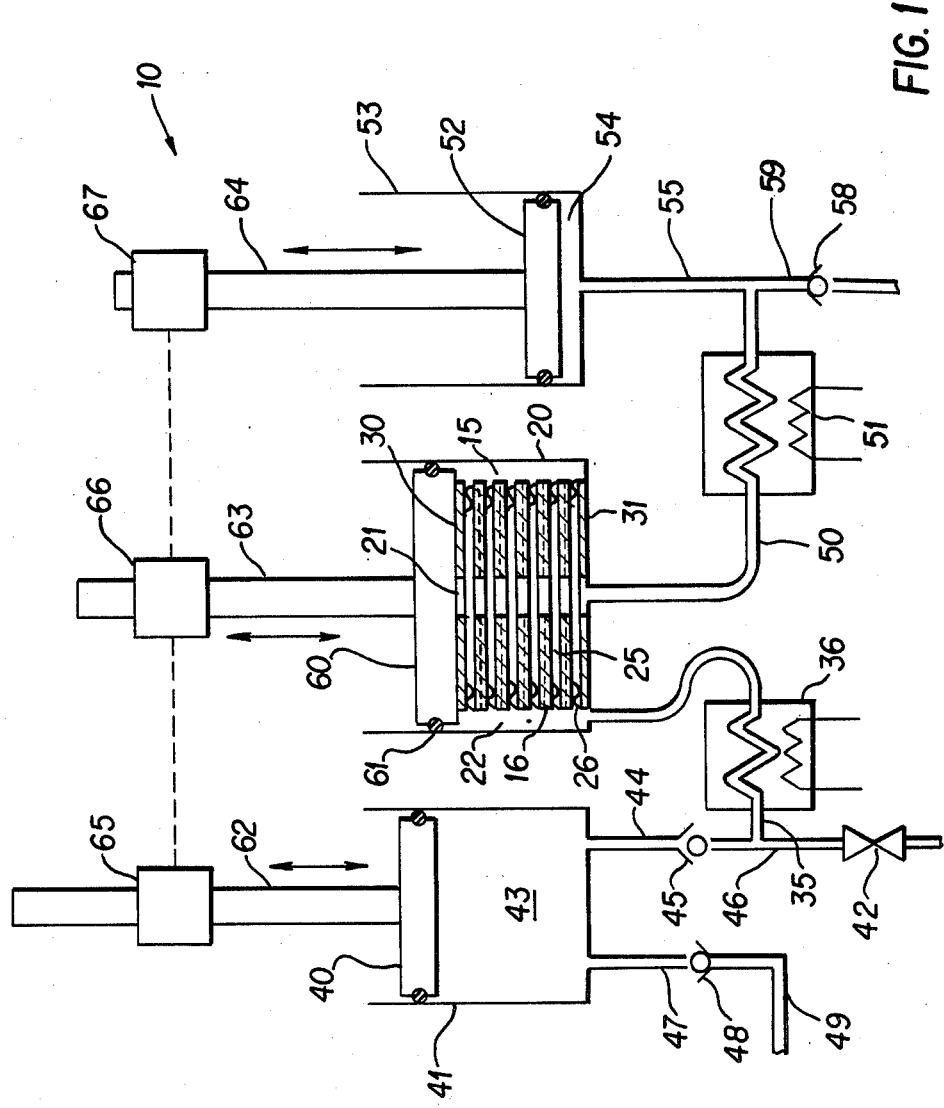
FIG. 1 is a simplified schematic of a pressure swing adsorption apparatus for purifying the less readily adsorbed component of a gas mixture, with a variable geometry adsorbent bed comprising a stack of annular adsorbent plates whose spacing may be varied by piston means.

A pressure swing adsorption apparatus 10 is adapted to separate and purify a product component from a feed gas mixture, using an adsorbent material over which the product component is less readily adsorbed relative to another more readily adsorbed component of the feed mixture. The selectivity distinction between more and less readily adsorbed components may be based on preferential equilibrium sorption or on preferential rate of sorption (or on a combination of equilibrium and kinetic selectivity), referred to the operating conditions of temperature, range of pressure excursions and cycle rate.

The apparatus 10 includes an adsorbent bed 15 comprising a stack of adsorbing plates 161 contained in an adsorbent bed housing 20. Each adsorbent plate 16 is a annular disc consisting of the adsorbent material attached to a rigid support matrix, such that gas flowing over the external surfaces of the adsorbent plate will contact the adsorbent material. The adsorbent plates also have material with heat capacity (which will be the adsorbent material, perhaps supplemented by the heat capacity of a metallic support matrix), so that heat may be exchanged between the adsorbent plates and gas flowing over their external surfaces. The adsorbent plates must be substantially identical, and must resist warping or other deformations. The central holes in the adsorbent discs line up to form an inner plenum 21. The adsorbent discs fit loosely in the housing 20, with a clearance gap which forms an outer plenum 22. The outer plenum defines a first end of the adsorbent bed, and the inner plenum defines a second end of the adsorbent bed.

The spaces between adjacent adsorbent plates serve as flow passages 25, which connect the outer plenum 22 to the inner plenum 21. The width of the flow passages 25 is controlled by spacer means 26. The stack of adsorbent plates is terminated at the upper end by a top end plate 30, and at the lower end by a bottom end plate 31. Here, the top and bottom ends of the stack must not be confused with the first and second ends of the the adsorbent bed, defined with respect to the flow path which in this case radially connects the inner and outer plenums. The axis of the stack is in the vertical direction of FIG. 1, transverse to the flow path defined by the radial flow passages between the adsorbent plates. Both the top and bottom end plates are coated with adsorbent material similar to one side of an adsorbent plate, so that all the flow passages will be substantially identical in both flow and adsorption characteristics. It will be seen that a stack of N adsorbent plates plus the top and bottom end plates will provide (N+1) flow passages 25, whose width must be kept closely identical at each instant by spacer means 26. These (N+1) flow passages provide the flow path through the adsorbent bed.

The adsorbent bed is connected at its first end through outer plenum 22 and conduit 35 to a first flow generation means. The flow passing through conduit 35 is maintained substantially at a first temperature T1 by heat exchanger means 36. The first flow generation means is here a cyclic volume displacement means provided as compression piston 40 reciprocating in compression cylinder 41, and cooperating with exhaust valve 42. The compression space 43 in compression cylinder 41 is connected by conduit 44 through optional feed non-return valve 45 to conduit 35 and thence to the outer plenum of the adsorbent bed, while exhaust valve 42 is connected by conduit 46 to conduit 35 and thence to the adsorbent bed.

The feed gas mixture is introduced into the compression space 43 by conduit 47 connected through inlet non-return valve 48 to feed conduit 49.

The adsorbent bed is connected at its second end through inner plenum 21 and conduit 50 to a second flow generation means. The flow passing through conduit 50 is maintained substantially at a second temperature T2 by heat exchanger means 51. The second flow generation means is here a cyclic volume displacement means provided as expansion piston 52 reciprocating in expansion cylinder 53. The expansion space 54 in expansion cylinder 53 is connected by conduit 55 to conduit 50, and thence to the inner plenum 21 of the adsorbent bed.

Throughout this specification, an expansion cyclic volume displacement means reciprocates with a leading phase of its volume variations with respect to the volume variations of a compression cyclic volume displacement means. Flow passing along the flow path in the direction from the first to the second end of the adsorbent bed will be provided by the first flow generation means at a relatively elevated higher pressure, while flow passing in the reverse direction from the second to the first end of the adsorbent bed will be provided by the second flow generation means at a lower pressure. When the flow generation means are reciprocating pistons in the cylinders as illustrated in FIG. 1 (or equivalent cyclic volume displacement means such as diaphrams or bellows), there will be more moles of gas in the compression cylinder when the pressure is being increased during a compression interval than when the pressure is being decreased during an expansion interval. Likewise, there will be more moles of gas in the expansion cylinder during an expansion interval than during a compression interval, due to the above defined phase relationship. as will be further explained with reference to FIG. 2.

It should be emphasized that the first and second temperatures T1 and T2 may be different, or they may be approximately identical. When the first and second temperatures are different, there will be a corresponding temperature gradient along the flow path through the adsorbent bed, which then functions as a thermal regenerator owing to the heat capacity of the adsorbent material and any metallic or other support material.

Product gas is delivered through product non-return valve 58, connected to conduit 50 by conduit 59. If the optional feed valve 45 is included in conduit 44, the entire low pressure flow of gas mixture enriched in the first component must be exhausted through exhaust valve 42, so gas entering the first end of the adsorbent bed is the feed gas mixture without any enrichment in the first component, thus reducing the concentration difference across the adsorbent bed and so enhancing the ability of the apparatus to produce purified second component as the product, although at very low recovery. When higher recovery of the second component is desired, feed valve 45 is omitted, so a smaller feed flow is required and the also smaller flow from exhaust valve 42 is more highly enriched in the second component, while the purity of the second component product may be somewhat reduced because of the greater concentration difference across the adsorbent bed.

The apparatus 10 as described above could operate with a fixed geometry adsorbent bed, in which the spacer means 26 are rigid to keep the width of the adsorbent bed flow channels constant. Considerable benefits are obtained in the present invention by operating with a variable geometry adsorbent bed, in which the now variable spacer means 26 provide freedom to adjust the width or the flow passages between minimum and maximum limits. It is desirable that the (N+1) flow passages be varied in synchronism. It is especially desirable that the minimum contracted width of the flow passages be closely identical.

It will be evident that there are many feasible ways to vary the width of the flow passages, including active mechanisms which vary the spacer means or move the adsorbent plates in rigid synchronism. The principle of one such mechanism is shown in FIG. 3. The relative spacing betwee the adsorbent plates may also be controlled passively, while the height of the entire stack is varied by an external actuator. In FIG. 1, the height of the adsorbent bed (stack of adsorbent plates) is varied by motion of adsorbent bed housing piston 60. Spacer means 26 are compression springs (here depicted as wave springs) which collapse to a minimum height, thus controlling the minimum flow passage width accurately when the bed is contracted to its minimum volume and stack height by piston 60. When the piston 60 is extended to enable expansion of bed volume and increase of stack height, spacing between the adsorbent plates is kept substantially equal by the force balance between the compression springs acting as spacer means 26. The stiffness of the compression springs in the stack should be selected to minimize errors in flow passage width uniformity resulting from the cumulative weight of the stack.

Tensile links between adjacent pairs of adsorbent plates may be engaged when the bed is fully expanded (maximum stack height) to limit the maximum spacing of the adsorbent plates more precisely. In FIG. 1, the function of tensile links can be provided by attaching or bonding each of the spring spacer means 26 to the adsorbent plates 16 on each side. The function of tensile links may also be provided by floating rigid links which engage between adjacent adsorbent plates when their gap is fully opened, while these tensile links are slackened when the bed is less than fully expanded. The minimum flow passage width can be controlled precisely by carefully dimensioned stops, which may be provided separately of (or in addition to) compression spring spacers. Interstitial gas between the plates will contribute a pneumatic compression spring effect helping keep the adsorbent plates uniformly separated when the stack height is changed rapidly.

In this invention, the main purpose of the variable geometry feature of the adsorbent bed is to compensate the effective compressibility of the adsorbent bed by changing its flow path volume, so that net flow into or out of the bed will be small during pressure changes. Flow through the bed can then be substantially confined to intervals when the pressure is near its maximum or minimum limits, improving separation performance and energy efficiency.

When the pressure is rising, the flow path volume of the adsorbent bed is contracted. When the pressure is reducing, the voidage of the adsorbent bed is expanded. The effective compressibility of the adsorbent bed includes the compressibility of the free gas mixture in the variable and fixed voidage of the adosrbent bed, including pores and dead volume in plenums and conduits. The effective compressibility of the adsorbent bed also includes the adsorptive capacity of the bed for the components of the mixture, which locally depends on the relative composition of the more and less readily adsorbed components, and for the whole bed therefore is sesitive to the position of the concentration wavefront in the bed.

By the above described approach of varying the flow path volume in the adsorbent bed to compensate for pressure changes, such pressure changes can be accomplished without significant net flow into or out of the adsorbent bed during intervals of pressure change. The adsorbent housing piston 60 is an actuator means acting to change adsorbent bed flow path volume, and thus enabling pressure changes to be accomplished within the adsorbent bed, and without external flow. Hence, flow through the flow passages of the adsorbent bed can be substantially limited to intervals when the pressure is at or near its upper and lower extremes. The first and second flow generation means are relieved of the need in prior art pressure swing adsorption devices to provide flow into the bed across the whole range of pressures (between the upper and lower pressure limits) as the pressure changes. In the present invention, flow through the adsorbent bed need only be generated at the upper and lower pressures (in opposite directions), which enables great improvement in the energy efficiency of the process.

It will be evident that energy applied to the adsorbent bed housing piston (or equivalent actuator means) to contract the adsorbent bed during a compression interval can be recovered by suitable mechanical means, since the same energy is delivered by the adsorbent bed housing piston when it expands the adsorbent bed during an expansion interval. If several identical apparatuses as shown in FIG. 1 are operated in parallel and with sequenced reciprocating phase, the expansion energy delivered from one apparatus can readily be recovered to provide compression energy to another apparatus, or indeed may be stored to return compression energy to the same apparatus which delivered the expansion energy.

In FIG. 1, the pistons have sealing means 61 to prevent leakage from their respective cylinders. Compression piston 40, adsorbent bed housing piston 60, and expansion piston 52 are respectively driven by piston rod linkage means 62, 63 and 64, which couple the pistons to reciprocating drive means 65, 66 and 67 respectively. The reciprocating drive means include means include means to provide compression energy to the apparatus and to recover expansion energy from the apparatus. Recovered expansion energy may be applied by the drive means to an external load such as another identical apparatus operating in parallel and in different phase, or may be stored by the drive means to be provided back to the apparatus later as compression energy.

The reciprocating drive means are coordinated to reciprocate at the same periodic frequency, and with relative phases and motion sequence to provide approximately the piston motion patterns depicted in FIG. 2, which further explains the operation of the apparatus.

FIG. 2

The apparatus of FIG. 1 is shown in four positions representing the four states of a complete operating cycle, with some details of FIG. 1 omitted for clarity. In FIG. 2 and the subsequent drawings, the heat exchangers 36 and 51 are omitted, although it will be understood that the compression and expansion ends of each embodiment may be maintained at different temperatures by suitable heat exchange and insulation means.

In FIG. 2A, the apparatus is in the same condition shown in FIG. 1, which corresponds to the end of a low pressure interval, just prior to recompression in a compression interval. Compression piston 40 and adsorbent bed housing piston 60 are fully extended, while expansion piston 52 is fully retracted. Hence, the compression space 43 and the adsorbent bed are fully expanded, while the expansion space 54 is fully contracted. Most of the gas is in the compression space and the adsorbent bed voidage.

In FIG. 2B, the pressure has been increased to a higher pressure during the compression interval. The compression piston has advanced to its new position 10.1, while the adsorbent bed housig piston has advanced to its high pressure position 60.1 so the adsorbent bed voidage is fully contracted. The same pressure rise has been accomplished in both the compression space and the adsorbent bed, while there has been little or no flow in conduit 35. The more readily adsorbed component is preferentially adsorbed by the adsorbent, so the gas in the flow passages contacting the adsorbent becomes enriched in the less readily adsorbed component. On the assumption that each portion of the apparatus is approximately isothermal, heat of compression is given off in the compression space, and heat of compression and heat of adsorption are stored in the adsorbent bed.

In FIG. 2C, the compression piston has been fully advanced from position 40.1 to new position 40.2, while the expansion piston has been retracted from position 52 to its new position 52.1, while the pressure remains substantially constant at the high pressure level. This opposite motion of the compression and expansion pistons causes the gas mixture to flow in the flow path through the adsorbent bed during the high pressure flow interval, preferentially transporting the less readily adsorbed component in the direction toward the expansion space. While the gas mixture flows through the adsorbent bed, the bed acts as a thermal regenerator so that the temperature of the gas in the outer and inner plenums remains near T1 and T2 respectively, with a corresponding temperature gradient along the flow passages through the bed. The flow in this direction stops before breakthough into the expansion space of the concentration wavefront within the adsorbent bed, so the gas entering the expansion space is the substantially purified less readily adsorbed component. A portion of this gas is withdrawn as the desired product through non-return valve 58, preferably near the beginning of the high pressure flow interval when the highest purity may be achieved.

In FIG. 2D, the apparatus has just completed a depressurization step during an expansion interval. While the compression piston remains stationary at its fully retracted position 40.2, the expansion piston extends from position 50.1 to position 50.2, and the adsorbent housing piston moves from position 60.1 back to position 60. The expansion of the adsorbent bed flow path volume compensates for the pressure rise so that flow in conduit 50 is minimal while the pressure decreases to its lower level. The first component which was preferentially adsorbed is now preferentially desorbed. Heat of expansion is taken up in the expansion space, while heat of expansion and heat of desorption are taken up in the adsorbent bed cancelling the heats of compression and of adsorption given off there during the compression step.

The cycle is completed as the apparatus returns from the position in FIG. 2D back to the position in FIG. 2A during a low pressure interval, as the compression piston moves from position 40.2 back to position 40, while the expansion piston advances from position 52.2 back to position 52. Since the first component is preferentially desorbed at low pressure, gas enriched in the first component flows into the compression cylinder during the low pressure flow interval.

The regenerative thermodynamic cycle described by the above steps with flow at constant pressure in each direction through the adsorbent bed (acting as a thermal regenerator) is known as the Ericsson cycle, which is related to the ideal Stirling cycle whose flow steps are theoretically conducted at constant volume. With the definition that volume changes in the expansion space always have a leading phase with respect to volume changes in the compression space, this cycle effectively transports heat from the expansion space to the compression space. If the first temperature is greater than the second temperature, the cycle is a heat pump cycle converting some of the heat of compression delivered to the compression space from mechanical work. If the second temperature is greater than the first temperature, the cycle is an engine cycle converting some of the heat of expansion taken up from the expansion space into mechanical work, which may assist operating the apparatus.

The above described coupled pressure swing adsorption cycle and thermodynamic cycle will apply in general to all of the embodiments of the invention to be described below. Volume changes in the expansion space always lead volume changes in the compression space, and the adsorbent bed is relatively expanded (or contracted) when the pressure is relatively high (or low). It will be appreciated that the described operating sequence could be realized by many different reciprocating mechanisms, which may in fact follow the described operating sequence only approximately while remaining within the scope of the invention. In particular, the pistons will have approximately sinusoidal motions if the reciprocating drive means are based on rotating cranks, and thus the pistons will only be momentarily stationary at the ends of their stroke. Similarly, most practicable Stirling engines only approximately follow the idealized Stirling or Ericsson thermodynamic cycles. Because of the relatively low operating speed of the invention (of the order of 5 to 50 RPM in present experimental apparatus) compared to typical reciprocating engines, it is possible to approximate the ideal cycle of FIG. 2 closely if desired, using reciprocating cam, linear actuator or lever drives. This typical range of operating speeds is much slower than conventional engines, but much faster than most pressure swing adsorption gas separation systems.

A particular example of the combined pressure swing adsorption cycle and a thermodynamic engine cycle is based on the use of waste heat from a combustion process as a power source to generate oxygen for the process. In this example based on FIGS. 1 and 2, the feed gas mixture is air introduced at atmospheric pressure and the adsorbent is a zeolite such as molecular sieve 13X. The first temperature is ambient temperature and the second temperature is an elevated temperature in the range of 100 to 200 degrees Celcius. The product gas is enriched oxygen delivered both preheated and precompressed, using waste heat as a power source for air separation with important benefits relative to prior art energy intensive air separation processes.

FIG. 3

Figure 3B:
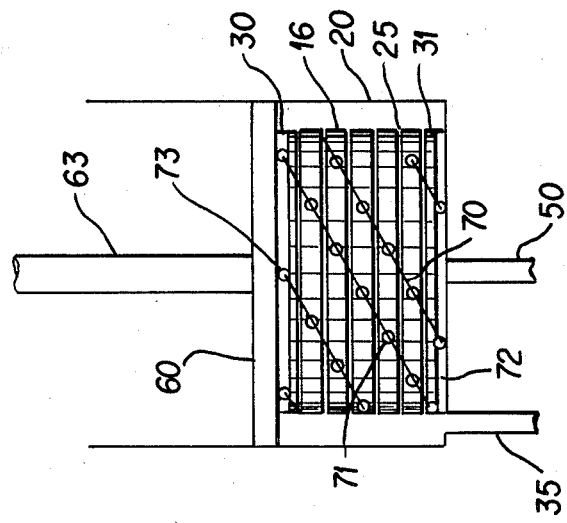
FIG. 3 shows a particular version of the variable geometry adsorbent bed of FIG. 1, in which the adsorbent plates are attached to cords which control their relative spacing.
Figure 3A:
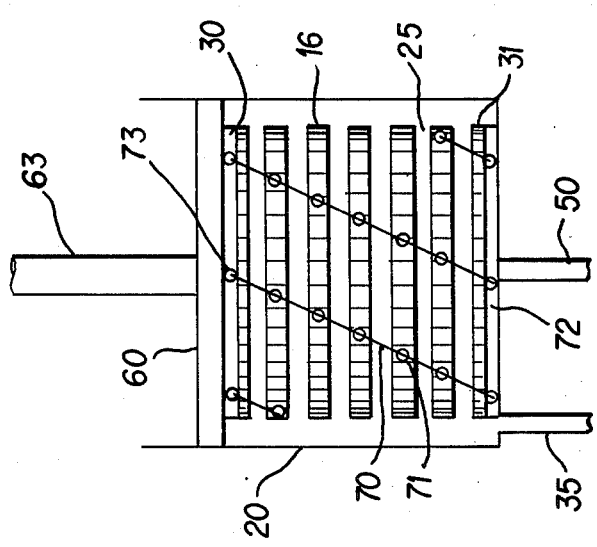

An embodiment of the variable geometry adsorbent bed has the spacing of the gaps between parallel adsorbent plates positively controlled by tensile cords 70 which are attached in helical geometry to each adsorbent plate at attachment points 71, and to the lower and upper end plates respectively at attachment points 72 and 73. The adsorbent bed is shown in its expanded position in FIG. 3A. In FIG. 3B, the adsorbent bed flow path volume has been contracted by simultaneously advancing and rotating piston 60 as shown, so that the gaps between the adsorbent plates are narrowed uniformly by changing the pitch of the helices defined by the cords, thus providing means to coordinate the spacing of the adsorbent plates during variation of adsorbent bed voidage volume.

FIG. 4

Figure 4B:
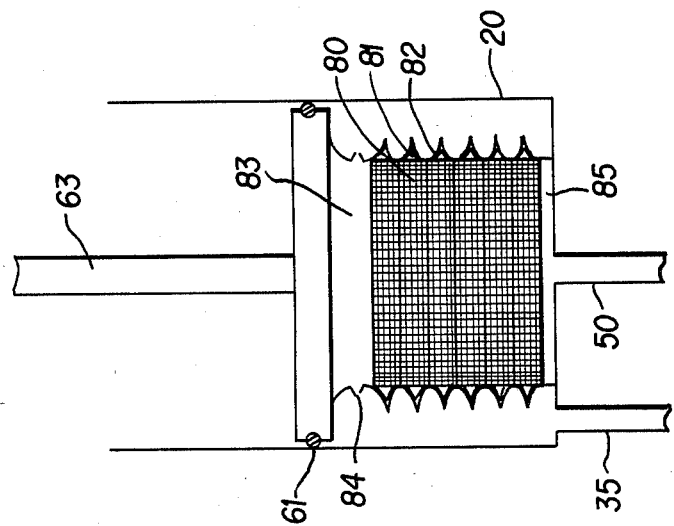
FIG. 4 shows an alternative variable geometry adsorbent bed configuration that may be substituted in the apparatus of FIG. 1, with a multiplicity of adsorbent segments disposed in series along the flow path through the adsorbent bed.
Figure 4A:
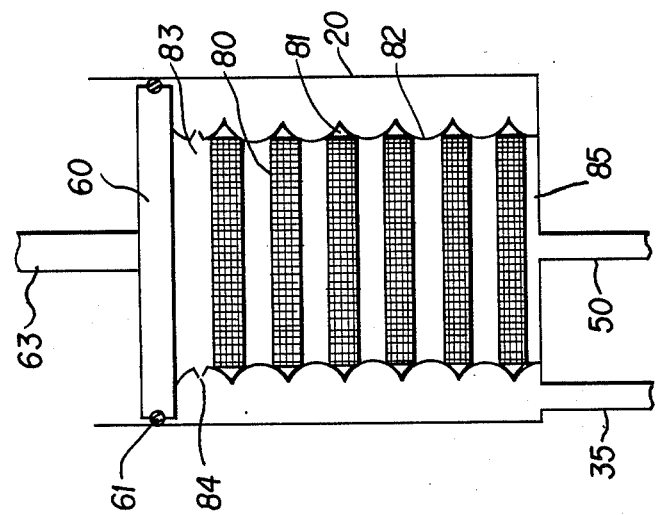

FIG. 4 shows an alternative adsorbent bed configuration, in which the bed consists of a multiplicity of adsorbent segments 80. Each segment 80 is a rigid structure containing adsorbent material, and occupies a complete section of the flow path while being porous in the direction of flow in the flow path. In FIG. 4, the adsorbent material in each segment is formed as a porous disc eclosed by a solid rim 81. The rims 81 are connected by convoluted diaphragms 82, which constitute flexible sealing means between the segments 80 confining all flow in the flow path to pass through the segments. The convoluted diaphragms 82 also act as tensile links between the segments limiting their maximum separation and spacing, and thus limiting the maximum flow path volume of the adsorbent bed. The minimum flow path volume of the adsorbent bed is clearly determined by the vanishing of the spaces between the segments when they are collapsed and closely nested together.

The flow path though the segments of the adsorbent bed in series communicates at a first end of the adsorbent bed with conduit 35 (leading to the first flow generation means) through plenum 83 and passage 84, and at a second end of the adsorbent bed with conduit 50 (leading to the second flow generation means) through plenum 85.

FIG. 5

Figure 5:
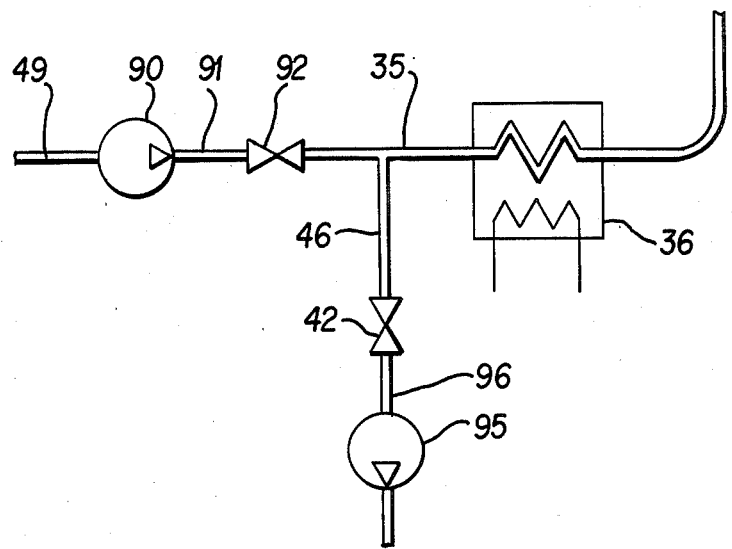
FIG. 5 shows an alternative flow generation means applicable to the apparatus of FIG. 1.

Since pressure changes inthe adsorbent bed can be accomplished without net flow into or out of the bed, by variation of the voidage volume so that the adsorbent bed in effect acts as its own compressor or expander during compression or decompression steps respectively, the first flow generation means can be equivalently provided as shown in FIG. 5 by a conventional compressor 90 connected by conduit 91 to feed valve 92, which admits feed gas from compressor 90 to the adsorbent bed through conduit 35 during the high pressure flow interval. Feed valve 92 is only opened when the adsorbent bed is contracted and the pressure has thus already been equalized to the upper pressure level. Hence, compressor 90 is only required to deliver flow to the apparatus at a constant pressure. It will be evident that a single compressor could provide flow to a multiplicity of identical pressure swing adsorption apparatuses operating in parallel and in phased sequence so the the flow demand from the compressor is uniform.

In principle the apparatus operates across a pressure difference between the feed delivery pressure in conduit 91 and the exhaust pressure from exhaust valve 42, and can operate at elevated or subatmospheric pressures. In order to illustrate the applicability of the invention to subatmospheric operation (which often provides enhanced adsorbent selectivity), FIG. 5 shows an optional vacuum pump 95 drawing the exhaust gas through conduit 96 from exhaust valve 42 during intervals of low pressure flow. Exhaust valve 42 is only opened when the pressure in the adsorbent bed has been equalized to the subatmospheric low pressure by expanding the flow path volume. Again, one vacuum pump could serve a multiplicity of identical gas separation units operating in parallel and in phased sequence.

FIG. 6

A pressure swing adsorption apparatus 100 is adapted to separate and purify a product component which is a more readily adsorbed component, from a feed gas mixture containing components which are relatively more and less readily adsorbed over an adsorbent material, according to either equilibrium or kinetic sorption selectivity.

The apparatus 100 includes an adsorbent bed 115 comprising a stack of adsorbent plates 116, contained in a portion of compression cylinder 120. The adsorbent plates are annular discs, whose central holes line up to form an inner plenum 121. The adsorbent plates fit loosely in cylinder 120, with an annular clearance gap which is an outer plenum 122.

The spaces between adjacent adsorbent plates serve as flow passages 125, connecting the inner and outer plenums. The width of the flow passages is controlled by extensible spacer means 126, which may be compression springs here shown as wave springs.

The stack of adsorbent plates is terminated at the upper end by top end plate 130, and at the lower end by bottom end plate 131 which forms an end closure for compression cylinder 120. The top end plate is attached to a piston rod 135 passing through the inner plenum 121, and connected to a piston 136. Piston 136 reciprocates in cylinder 137, which on one side of the piston 136 is an extension of inner plenum 121, and on the other side of piston 136 is open to atmosphere. The maximum expansion of the adsorbent bed is limited by stop 138 which restricts the travel of piston 136. When the pressure within the apparatus is relatively low, the adsorbent bed is expanded by the compression spring effect of spacer means 126. When the pressure within the apparatus is increased, the unbalanced force of piston 136 overcomes the spring stiffness of spacer means 126, and the flow path volume contracts in accordance with outward motion of piston 136. It is evident that piston 136 is a pressure responsive means to change adsorbent bed flow path volume in accordance with changes of total pressure within the adsorbent bed.

Compression piston 140 reciprocates to change the volume of compression space 143 in compression cylinder 120. The inner plenum 121 of the adsorbent bed is connected through conduit 148, optional inlet valve 149 and conduit 150 to expansion space 152 in expansion cylinder 154. Inlet valve 149 is opened during high pressure intervals to admit a flow of gas mixture enriched in the second component to expansion space 152. Inlet valve 149 is closed during low pressure intervals, when the feed gas mixture is introduced into conduit 148 from conduit 160, non-return valve 161, feed compressor means 162, and feed supply conduit 163. During low pressure intervals, the gas mixture enriched in the second component is exhausted from conduit 165 to exhaust valve 166 and exhaust conduit 167. Exhaust valve 166 is closed when the pressure in expansion space 152 is elevated, and is only opened after full recovery of expansion energy by expansion piston 152, when the pressure in conduits 165 and 167 has been equalized by decompression within the expansion space.

It is seen that the expansion cylinder 153 acts as an energy recovery expansion engine. Inlet valve 149 enables complete removal of the gas mixture enriched in the second component after each cycle, which is desirable if the first component is to be purified and low recovery of the purified first component can be tolerated. If higher recovery of the first component is required, inlet valve 149 is simply omitted. A smaller flow may then be removed from exhaust conduit 167, with greater enrichment in the second component.

The purified component is removed from the compression space 143 though conduit 170, product valve 171, and product delivery conduit 172.

As discussed above, few prior art pressure swing adsorption devices have been capable of delivering the more readily adsorbed fraction as a purified product. The apparatus of FIG. 6 may be operated with a zeolite adsorbent such as molecular sieve 13X, over which nitrogen is a more relatively adsorbed component relative to oxygen and argon according to equilibrium selectivity at room temperature. The purified product delivered from conduit 172 will then be nitrogen, while enriched argon and oxygen will be delivered from conduit 167.

Figure 6:
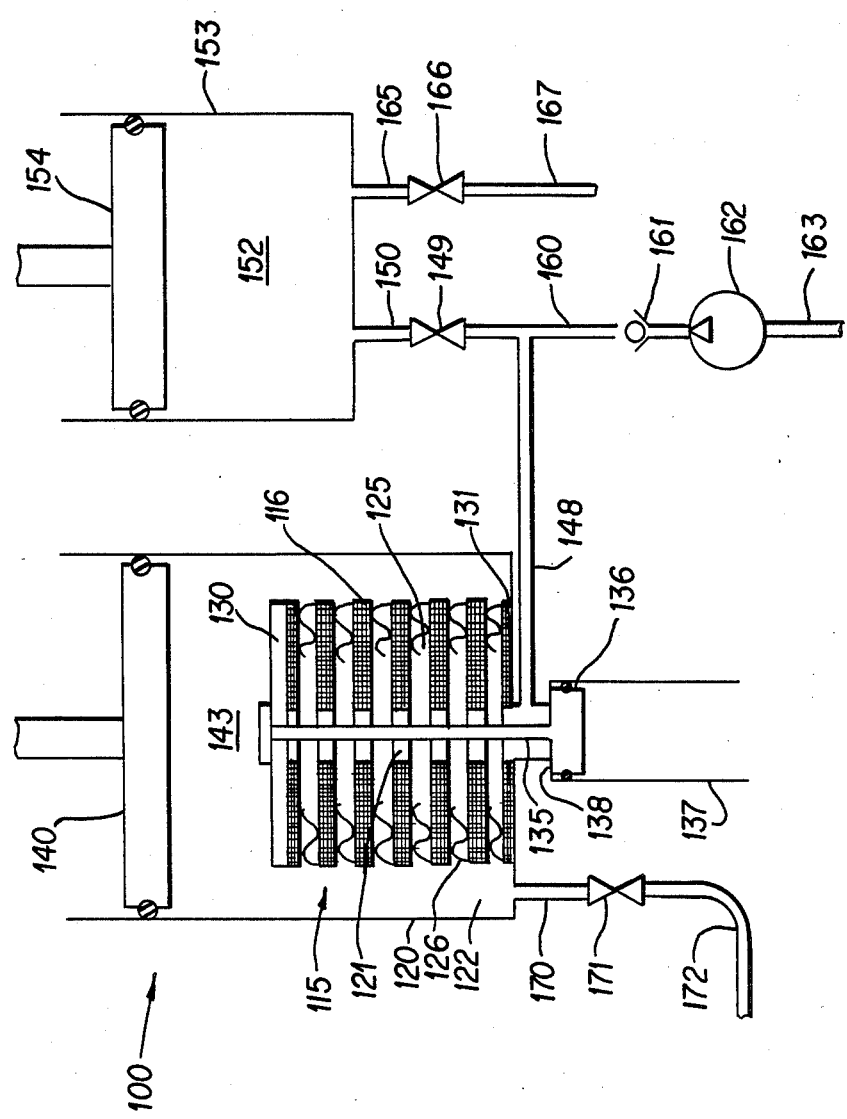
FIG. 6 is a simplified schematic of a pressure swing adsorption apparatus for purifying the more readily adsorbed component of a gas mixture, and adapted to use variations in internal pressure to vary the spacing of the adsorbent plates.

The apparatus of FIG. 6 may also be operated with carbon molecular sieve (or a tight pore zeolite) over which oxygen is adsorbed more rapidly than nitrogen or argon under sudden pressure rise, because the higher diffusivity of oxygen provides a knietic selectivity according to preferential rate of sorption. When the apparatus is operated at an appropriately fast cycle rate, oxygen is thus the more readily adsorbed component relative to both nitrogen and argon. Hence, purified oxygen product is delivered from product delivery conduit 172, while enriched nitrogen and argon are delivered through exhaust conduit 167.

This aspect of the present invention is a most important development, since prior art pressure swing adsorption systems have been unable to purify oxygen to greater than about 95% purity over zeolites because the equilibrium separation concentrates argon with the oxygen, and the use of carbon molecular sieves (or other kinetic rate selective adsorbent) to deliver high purity oxygen in a single stage air separation plant has not been disclosed previously, as adsorption over carbon molecular sieves has been previously found suitable for concentrating nitrogen as the less readily adsorbed component.

FIG. 7

Figure 7:
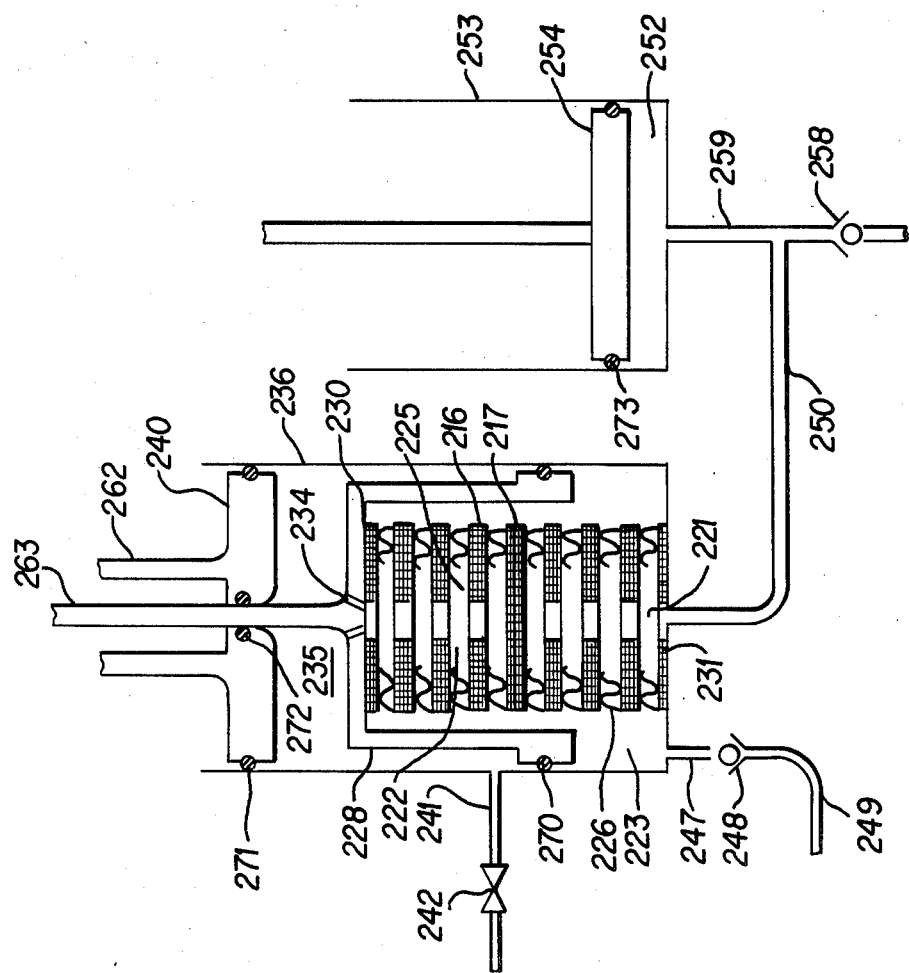
FIG. 7 is a simplified schematic of a pressure swing adsorption apparatus for separting both more and less readily adsorbed components as purified products.

The apparatus of FIG. 7 is able to achieve essentially complete separation of the more and less readily adsorbed components of a two component mixture. The feed mixture is introduced to a central portion of the adsorbent bed, so that substantially pure first component is delivered from the compression space and substantially pure second component is delivered from the expansion space.

The adsorbent bed comprises a stack of adsorbent plates 216 which are annular discs, except for a non-perforated adsorbent plate 217 at an intermediate point of the stack which is a solid disc with no central hole. The central holes of the adsorbent plates below and above the non-perforated adsorbent plate 217 line up to form lower inner plenum 221 and upper inner plenum 222 respectively. An outer plenum 223 is defined by the clearance gap outside the entire stack of adsorbent plates.

Flow channels 225 are provided by the gaps between adjacent adsorbent plates, whose spacing is controlled by spacer means 226. The height of the adsorbent bed stack and thus the volume of the adsorbent bed are cyclically varied by reciprocating adsorbent bed housing piston 228. The adsorbent stack is terminated at upper and lower ends by upper end plate 230 and lower end plate 231, which are coated with adsorbent material. The upper inner plenum 222 is connected by passage 234 to the compression space 235 in compression cylinder 236, whose volume is changed by reciprocating compression piston 240. A first product of purified first component is withdrawn from the compression spring 235 through conduit 241 and first product delivery valve 242.

The feed mixture is introduced to the outer plenum through conduit 247 and feed non-return valve 248. The lower inner plenum 221 is connected by conduit 250 to the expansion space 252 in expansion cylinder 253, whose volume is changed by reciprocating expansion piston 254. A second product of purified second component is delivered from the expansion space through non-return valve 258 and conduit 259.

It is seen that the flow path through the adsorbent bed passes from conduit 250 connecting to the expansion space, through lower inner plenum 221, though the flow passages in a lower portion of the adsorbent bed into outer plenum 223, from outer plenum 223 back through the flow passages in an upper portion of the adsorbent bed, into the upper inner plenum 222, and through passage 234 into compression space 235. The non-perforated adsorbent plate 217 serves to reverse the radial direction of flow between upper and lower portion of the adsorbent bed, so that the feed can be introduced to a central portion of the flow path in the adsorbent bed. The first end of the adsorbent bed is defined by upper inner plenum 222, while the second end of the adsorbent bed is defined by lower inner plenum 221.

The compression piston 240 is connected to its reciprocating drive means (not shown) by rod means 262, while the adsorbent bed housing piston 228 is reciprocated by piston rod 263 and associated drive means. Piston seal means 270 and 271 are provided by pistons 228 and 240 respectively, while gland seal 272 seals the sliding penetration of piston rod 263 through the compression piston 240.

It will be evident that introduction of the feed gas mixture to a central portion of an adsorbent bed similar to that shown in FIG. 4 could be achieved easily, by providing a feed passage through the sealing means between any pair of adsorbent segments.

FIG. 8

Figure 8:
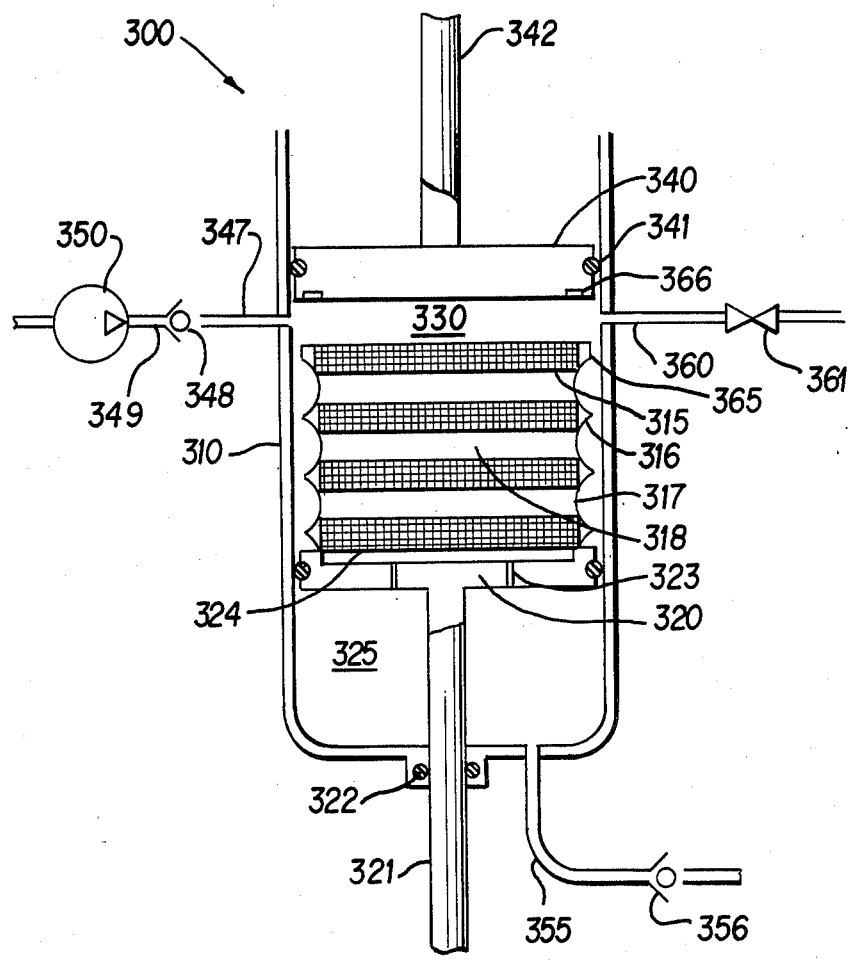
FIG. 8 is a simplified schematic of a pressure swing adsorption apparatus with the variable geometry adsorbent bed mounted on an expansion piston.

FIG. 8 is an elevation schematic of a vertically mounted apparatus 300 for separating a product of purified second component, in which the compression and expansion spaces plus the adsorbent bed are contained in a single cylinder housing 310. In this embodiment pressure changes during compression and expansion will be provided by a single "power" piston, while a single "displacer" piston will serve as first and second flow generation means as it causes flow through the adsorbent bed in its opposite directions of travel, during high and low pressure flow intervals respectively. This terminology corresponds to a class of Stirling engines, where a pressure loaded power piston acts to change the internal working volume, while a lightly loaded displacer piston acts to move gas through the regenerator without significantly changing the volume.

The adsorbent bed comprises a multiplicity of adsorbent segments 315 which are porous discs of adsorbent material with annular solid rims 316. The annular rims of adjacent segments are connected by convoluted diaphragm 317, which serves as flexible sealing means confining the flow path to pass through the adsorbent segments. Variable spaces 318 between the segments constitute the variable portion of the voidage volume of the adsorbent bed.

The adsorbent bed is mounted on a displacer piston 320 which is reciprocated by external drive means through piston rod 321, passing through gland seal 322 in the end closure of cylinder housing 310. Passages 323 through displacer piston 320 connect a lower plenum 324 with expansion space 325. The diaphragm 317 is attached to displacer piston 320 to seal lower plenum 324.

The flow path passes from the expansion space 325 through passages 323 and plenum 324 through all the adsorbent segments and the spaces between the segments to emerge in compression space 330. A power piston 340 is sealed by seal 341 and is reciprocated by external drive means through piston rod 342.

The feed gas mixture is admitted to the compression space through conduit 347, inlet valve 348 and conduit 349 from feed compressor (or blower) 350. Product gas of purified second component is delivered through conduit 355 and product delivery valve 356. Gas mixture enriched in the first component is exhausted through conduit 360 and exhaust valve 361. Valves 348 and 361 may be ports opened to compression space 330 by the power piston at the top of its stroke (ending an expansion interval), so that the power piston itself acts as a valve, with blower 350 then only required if forced circulation of feed is necessary.

During the compression interval, the displacer piston is at the bottom of cylinder housing 310, while the power piston 340 moves downward to reduce the total internal working volume and thus raise the pressure. As the pressure rises and under the influence of gravity, the adsorbent bed collapses to its fully contracted position.

During the high pressure flow interval, the power piston 340 remains substantially stationary while the displacer piston 320 travels upward. The downward pressure gradient caused by friction of flow through the bed keeps the adsorbent bed fully contracted. The upper annular ring 365 on the upper adsorbent segment and a matching ring 366 on the bottom side of the power piston are both of magnetic material which attract each other strongly when they come into contact.

During the decompression interval, power piston 340 moves upward to reduce total volume of the internal working volume and thus reduce pressure, while displacer piston 320 also moves upward at a slower rate so that the separation between the pistons increases. Mutually attracted magnetic rings 365 and 366 remain engaged with sufficient attractive force to expand the adsorbent bed against the influence of gravity. It is seen that the pair of magnetic rings 365 and 366 act as a latch means, whereby the upper segment of the adsorbent bed becomes attached to the lower side of the power piston, and that this latch means will separate when the force pulling the adsorbent bed away from the power piston exceeds a certain value.

During the low pressure flow interval, the power piston 340 remains substantially stationary while the displacer piston moves downward. The magnetic latch means separates, but the adsorbent bed remains fully expanded because of the upward pressure gradient associated with the gas flow through the bed. It is seen that the expansion and contraction of the adsorbent bed is responsive in this embodiment to the direction of flow through the bed and along the flow path.

FIG. 9

Figure 9:
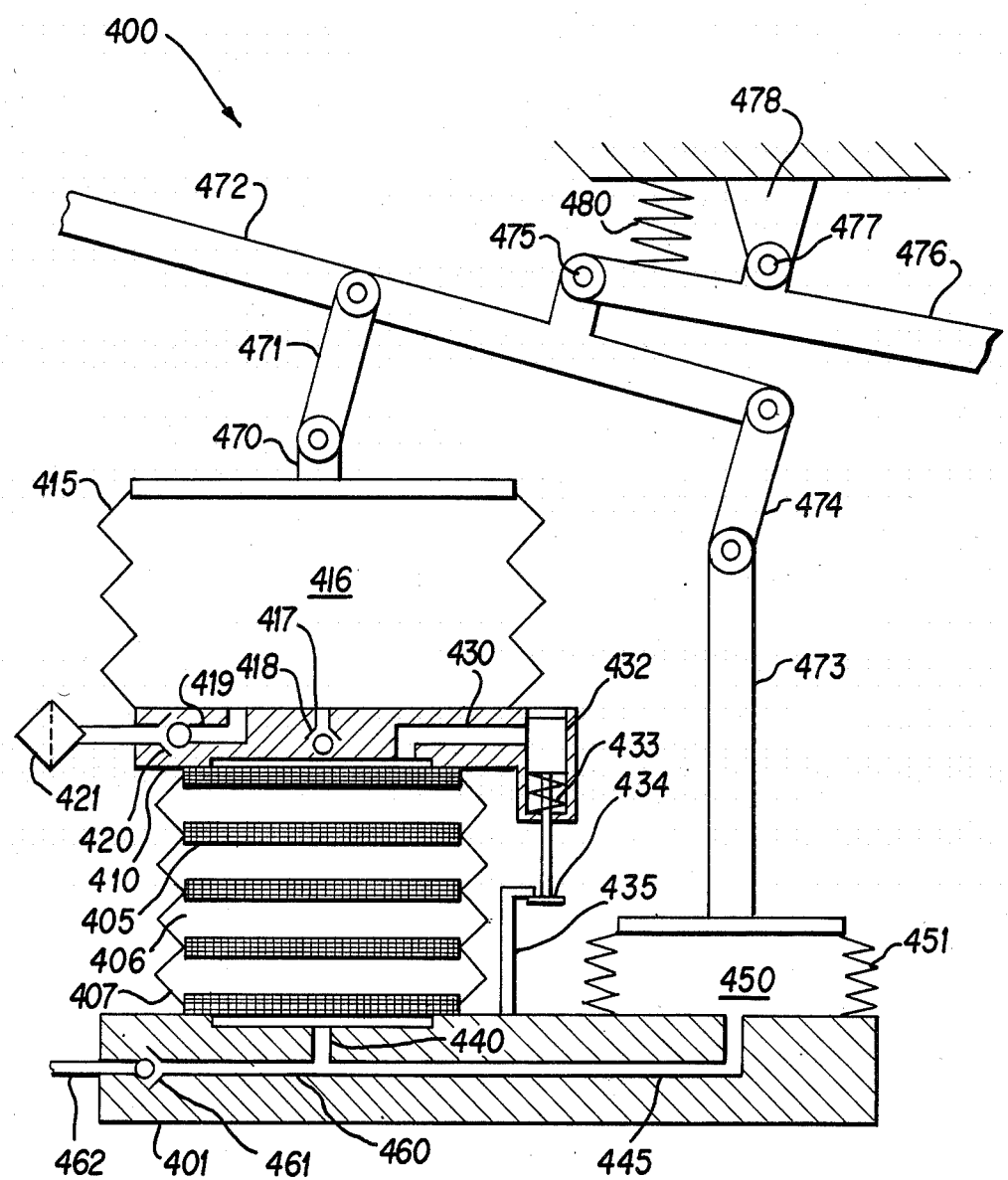
FIG. 9 is a simplified schematic of a pressure swing adsorption apparatus operated by two hand levers to separate oxygen from air.

FIG. 9 shows a manually operated apparatus 400 for separating enriched oxygen from air.

The apparatus is mounted on a base 401. The adsorbent bed itself is mounted on the base, and comprises adsorbent segments 405 separated by spaces 406 and enclosed by convoluted diaphragm means 407 which confines the flow path to pass through the adsorbent segments. The adsorbent is a molecular sieve zeolite over which nitrogen is more readily adsorbed and oxygen is less readily adsorbed. The convoluted diaphragm 20 is attached at its lower end to the base, and at its upper end to a valve manifold block 410. Valve manifold block 410 is attached in turn to compression diaphragm 415 which is the first flow generation means and encloses the compression space 416.

The compression space is connected to the upper end of the adsorbent bed by conduit 417 and discharge non-return valve 418 passing through the valve manifold block. The feed air enters the compression space through conduit 419, suction non-return valve 420, and inlet strainer 421.

Air enriched in nitrogen is discharged form the upper end of the adsorbent bed through conduit 430 and normally closed exhaust valve 432. Exhaust valve spool 432 is kept in its upper position closing conduit 430 under bias from compression spring 433, except when pulled downward by pull rod 434 to open conduit 430. When the adsorbent bed is fully expanded under reduced pressure, valve manifold block 410 is pulled upward and away from base 401, so that pull rod 434 strikes stop rod 435 and shifts the exhaust valve spool to its open position. Stop rod 435 is rigidly mounted on base 401. It is seen that the opening of the exhaust valve is responsive to the expansion of the adsorbent bed flow path volume, to the associated reduction of pressure in the apparatus, and to the direction of force transmitted through compression diaphragm 415 and the adsorbent bed sealing means 407 to base 401. This force will be compressive when internal pressure is elevated, but will become tensile when internal pressure becomes subatmospheric, neglecting elastic stresses in the diaphragm and sealing bellows.

The lower end of the adsorbent bed attached to the base 401 is connected by conduit 440 and conduit 445 to the expansion space 450, which is eclosed by expansion diaphragm 451 acting as the second flow generation means. The enriched oxygen product is delivered from the adsorbent bed through conduit 440 and conduit 460 connecting to product delivery valve 461 and product delivery conduit 462.

The compression diaphragm 415 is reciprocated by rod 470 driven through link 471 by lever 472, while the expansion diaphragm is driven through rod 473 and connecting link 474. Connecting links 471 and 474 and connected to the first lever 472, which pivots centrally about a floating pivot 475 hinged to a second lever 476. Floating pivot 475 is shifted by motion of the second lever 476, which pivots around hinge 477 on fixed support 478. It is seen that only small forces are required to operate the first lever, if its pivot 475 is central between the hinges on links 471 and 474, because the force couples can thus be balanced. However substantial forces are applied to lever 476 because its actuation changes the internal volume and pressure of the entire apparatus.

Compression spring 480 acts as a force counterweight on lever 476 so that the spring assists the action of the lever in increasing the pressure and resists the action of the lever in reducing the pressure. The expansion energy associated with reducing the pressure is in part stored by the spring, and then restored to the apparatus as compression energy when the pressure is next increased, thus achieving partial energy recovery. It will be evident that two apparatuses similar to that of FIG. 9 could equivalently be operated back to back, working 180 degrees out of phase and achieving partial energy recovery by direct exchange of expansion and compression energy.

The invention has been described in several basic embodiments which illustrate the principles of operation. The principle of varying the flow path volume of the adsorbent bed may be applied to more complex gas separation applications, in which several adsorbent beds and flow generation means may be used within a single internal working volume to separate more than two product fractions from a multicomponent mixture. As described in my copending application 06/866,395, now U.S. Pat. No. 4,702,903, chemical reactions may be conducted within the internal working volume of an apparatus combining pressure swing adsorption and a regenerative thermodynamic cycle. The apparatus then separates a gas mixture including the reactant(s) and product(s) of the reaction, which introduces this gas mixture to the flow path through the adsorbent bed. The present invention applies to chemical reactions conducted within the expansion or compression space, or within the variable geometry adsorbent bed, in which the object of the separation is to remove the products of the reaction from a reaction zone within the apparatus, and concentrate the reactions within the reaction zone, thus shifting reaction equilibrium favourably.

It will be evident that many alternative variable geometry adsorbent bed configurations are possible. The simple configurations disclosed above demonstrate practicable realizations of the requirements that the variable geometry adsorbent bed is longitudinally organized (thus maintaining the ordering of thermal and concentration gradients along the flow path) and transversely symmetric (so that parallel flow passages comprising the flow path are substantially identical, and the bed thus resists channeling along any one passage which would distort concentration and thermal wavefronts adversely), while the flow is confined to pass through the adsorbent bed without bypass. These requirements may be met by many other adsorbent bed geometries whose components may be nesting cones or other shapes. The flow path of the adsorbent bed may also be varied by the cyclic insertion and removal of solid volume displacement elements into voidage spaces between fixed adsorbent segments of the bed, thus varying adsorbent bed geometry without necessarily moving the adsorbent itself.

It will be apparent to those skilled in the art that the invention may be expressed in many embodiments and combinations other than those described above, all within the scope of the following claims.

I claim:

1. A process for separating components of a gas mixture containing a first component which is more readily adsorbed and a second component which is less readily adsorbed by an adsorbent material, the process including the steps of;
   (a) introducing the gas mixture into a flow path having first and second ends and an adsorbent bed containing the adsorbent material and providing a flow path volume associated with the flow path and including volume of flow channels of the adsorbent bed, the flow path being disposed between first and second cyclic flow generation means at opposite ends of the adsorbent bed
   (b) cyclically imposing a flow of the gas mixture in the flow path so as to have cyclic reversals of flow direction along the flow path at a periodic frequency,
   (c) cyclically exchanging heat between the gas mixture in the flow path and a material with heat capacity disposed along the flow path,
   (d) cyclically varying total pressure of the gas mixture in the flow path between upper and lower limits, at the same periodic frequency and with phase coordinated with the cyclic reversals of the flow direction,
   (e) preferentially adsorbing the first component on the adsorbent material under increased pressure when the gas mixture is flowing along the flow path in the direction toward the second end of the adsorbent bed, and desorbing the first component so that it is free to move with the flow under decreased pressure and the flow direction is reversed toward the first end of the adsorbent bed,
   (f) separating the gas mixture in the flow path by enriching flow toward the first end of the bed in the first component, and enriching flow toward the second end of the bed in the second component,
   (g) cyclically varying the flow path volume between minimum and maximum limits in accordance with the cyclic pressure variations, so the flow path volume is reduced toward the minimum limit thereof when pressure is higher, and the flow path volume is increased toward the maximum limit thereof when the pressure is lower.

2. The process of claim 1 further characterized by:
   (a) reducing the flow path volume of the absorbent bed towards the minimum limit thereof simultaneously while pressure is increasing,
   (b) increasing the flow path volume towards the maximum limit thereof simultaneously while the pressure is decreasing.

3. The process of claim 1 further characterized by:
   (a) communicating the first and second cyclic flow generation means with the first and second ends respectively of the adsorbent bed,
   (b) operating the first and second flow generation means at equal periodic frequencies and with a different phase to impose the said cyclic flow reversals along the flow path.

4. A process as claimed in claim 1 further characterized by:
   (a) providing in the adsorbent bed a plurality of bed components cooperating with adsorbent material, the bed components being separated by flow channels,
   (b) cyclically varying volume of the flow channels between minimum and maximum limits so as to vary the flow path volume of the adsorbent bed.

5. A process as claimed in claim 1 further characterized by:
   (a) providing a plurality of adsorbent bed components which are substantially rigid components containing porous adsorbent material,
   (b) permitting flow of gas along the flow path, to pass through the porous material of the bed components,
   (c) sealing spacing between the bed components so that flow in the flow path must pass through the components in series,
   (d) cyclically varying voidage volume by varying spacing between the bed components.

6. A process as claimed in claim 1 further characterized by:
   (a) varying the flow path volume of the adsorbent bed in response to total pressure within the adsorbent bed,
   (b) contracting the flow path volume when pressure within the adsorbent bed is relatively high,
   (c) expanding flow path volume when pressure within the adsorbent bed is relatively low.

7. A process as claimed in claim 1 further characterized by:
   (a) varying the flow path volume of the adsorbent bed in response to pressure drop due to flow friction along the flow channels,
   (b) varying the flow path volume of the adsorbent bed by an amount dependent on direction of flow in the flow path,
   (c) contracting the flow path volume and directing flow in the flow path towards the second end of the bed during high pressure intervals,
   (d) expanding the flow path volume and directing flow in the flow path towards the first end of the bed during low pressure intervals.

8. A process as claimed in claim 1 further characterized by:
   (a) cyclically varying portions of the flow path volume adjacent the ends of the bed so that the cyclic volume changes adjacent the first end of the bed have a leading phase with respect to cyclic volume changes adjacent the second end of the bed.

9. A process as claimed in claim 8 further characterized by:
   (a) feeding the gas mixture into the flow path adjacent an intermediate portion of the adsorbent bed,
   (b) withdrawing gas enriched in the first component from adjacent the first end of the adsorbent bed,
   (c) withdrawing gas enriched in the second component from adjacent the second end of the adsorbent bed.

10. A process as claimed in claim 8 further characterized by:
    (a) feeding the gas mixture through a non-return valve means into the first end of the adsorbent bed,
    (b) withdrawing gas enriched in the second component from adjacent the second end of the adsorbent bed,
    (c) withdrawing gas enriched in the first component from adjacent the first end of the bed.

11. A process as claimed in claim 10 further characterized by:

(a) withdrawing the gas enriched in the second component from adjacent the first end of the adsorbent bed through a normally closed exhaust valve means, (b) opening the said exhaust valve means in cooperation with expansion of the adsorbent bed flow path volume after reaching total pressure in the adsorbent bed.

12. A process as claimed in claim 8 further characterized by:

(a) feeding the gas mixture into the flow path adjacent the second end of the adsorbent bed, (b) withdrawing a mixture enriched in the first component from adjacent the first end of the adsorbent bed, (c) withdrawing a mixture enriched in the second component from adjacent the second end of the adsorbent bed.

13. A process as claimed in claim 3 further characterized by:

(a) providing a first volume displacement means as the first flow generation means, (b) providing a second volume displacement means as the second flow generation means, (c) cyclically displacing the first and second volume displacement means at equal frequencies and with cyclic volume changes in the second volume displacement means having a leading phase with respect to cyclic volume changes in the first volume displacement means.

14. A process as claimed in claim 13 further characterized by:

(a) delivering net heat of compression over each complete cycle by the first volume displacement means, (b) taking up net heat of expansion over each complete cycle by the second volume displacement means, (c) converting energy between thermal energy and mechanical work in response to any temperature difference between the first and second temperatures.

15. A process as claimed in claim 14 further characterized by:

(a) maintaining the first temperature higher than the second temperature, (b) converting mechanical work to a portion of net heat of compression delivered by the first volume displacement means by a regenerative heat pump cycle.

16. A process as claimed in claim 14 further characterized by:

(a) maintaining the second temperature higher than the first temperature, (b) converting a portion of the net heat of expansion taken up by the second volume displacement means into mechanical work by a regenerative engine cycle.

17. A process as claimed in claim 2 further characterized by:

(a) from a low pressure condition in which the flow path volume is expanded, the first flow generation means is expanded, and the second flow generation means is contracted, while maintaining the second flow generation means contracted, contracting the first flow generation means and the flow path volume to increase pressure with essentially no flow along the adsorbent bed, (b) subsequently, while maintaining the flow path volume contracted and the pressure increased, further contracting the first flow generation means and expanding the second flow generation means to induce flow along the adsorbent bed, (c) subsequently, while maintaining the first flow generation means contracted, expanding the flow path volume and the second flow generation means to decrease pressure with essentially no flow through the bed, (d) subsequently, while maintaining the flow path volume expanded and the pressure reduced, expanding the first flow generation means and contracting the second flow regeneration means to induce flow along the bed.

18. A process as claimed in claim 11 further characterized by:

(a) opening the exhaust valve means in response to maximum spacing between components of the adsorbent bed, so that the exhaust valve is open when flow path volume is maximum, (b) maintaining the exhaust valve means closed when the flow path volume is below maximum.

19. The process as claimed in claim 1 further characterized by:

(a) maintaining the first end of the adsorbent bed approximately at a first temperature and the second end of the adsorbent bed approximately at a second temperature.

20. A process for separating components of a gas mixture, the process including the steps of:

(a) providing a gas mixture containing a first component which is more rapidly adsorbed by an adsorbent material under increase of pressure than a second component of the gas mixture, so that the selectivity of the adsorbed between the first and second components is substantially based on preferential rate of sorption, (b) introducing the gas mixture into a flow path through an adsorbent bed containing the adsorbent material, (c) connecting a first end of the adsorbent bed to a first volume displacement means maintained approximately at a first temperature, and connecting a second end of the adsorbent bed to a second volume displacement means maintained approximately at a second temperature, (d) cyclically varying the volume of the flow path by displacing the first and second volume displacement means, at equal frequencies and with a leading phase of volume changes generated by the second volume displacement means relative to volume changes generated by the first volume displacement means, thus imposing cyclically reversing flow in the flow path and cyclic variations of pressure in the adsorbent bed, (e) preferentially adsorbing the first component under increased pressure when the flow is directed toward the second volume displacement means and the flow is then enriched in the second component, (f) followed by preferentially desorbing the first component under reduced pressure when the flow is directed toward the first volume displacement means and the flow is then enriched in the first component, (g) separating the first component toward the first volume displacement means, and separating the second component toward the second volume displacement means, (h) withdrawing gas enriched in the first component from adjacent the first volume displacement means, and withdrawing gas enriched in the second component from adjacent the second volume displacement means, (i) over each complete cycle, delivering net heat of compression from adjacent the first volume displacement means and taking up net heat of expansion adjacent the second volume displacement means.

21. An apparatus for pressure swing adsorption separation between first and second gas components of a gas mixture, the first component being more readily adsorbed than the second component by an adsorbent material under increase of pressure, the apparatus including:

(a) an adsorbent bed having first and second ends and containing the adsorbent material disposed along a flow path, the adsorbent bed having a variable flow path volume associated with the flow path and means for varying cyclically the flow path volume of the adsorbent bed, (b) first and second flow generation means ommunicating with first and second ends respectively of the adsorbent bed, (c) means to cyclically operate the first and second flow generation means at equal periodic frequencies, and with different phase to impose flow of the gas mixture in the flow path with cyclic reversals of flow direction along the flow path, while also cyclically varying the total pressure in the flow path in the same frequency, so that the pressure is relatively high when the flow in the flow path is directed toward the second flow generation means, and the pressure is relatively low when the flow in the flow path is directed toward the first flow generation means, (d) for coordinating the cyclical variations of the flow path volume of the adsorbent bed with the cyclic operation of the first and second flow generation means, 22. The process of claim 20 in which the gas mixture is air, and the adsorbent material is carbon molecular sieve which more rapidly adsorbs oxygen relative to nitrogen and argon, the process being further characterized by:

(a) withdrawing purified oxygen from adjacent the first volume displacement means, (b) withdrawing nitrogen and argon from adjacent the second volume displacement means.

23. An apparatus as claimed in claim 21 in which:

(a) the flow path volume includes volume of flow channels of the adsorbent bed, (b) and the means for varying cyclically the flow path volume of the adsorbent bed includes means to vary volume of the flow channels of the adsorbent bed.

24. An apparatus as claimed in claim 21 further characterized by:

(a) the adsorbent bed including a plurality of bed components containing adsorbent material, the bed components being spaced apart to provide the flow channels therebetween, (b) means for varying spacing between the bed components so as to vary flow path volume.

25. An apparatus as claimed in claim 21 further characterized by:

(a) means to maintain the first end of the adsorbent bed at a first temperature, (b) means to maintain a second end of the bed at a second temperature.

26. An apparatus as claimed in claim 24 in which:

(a) the bed components are substantially rigid plates cooperating with the adsorbent material, (b) the plates are spaced apart by variable gaps which, at a particular instant, provide substantially identical flow passages, disposed in parallel, between the adsorbent plates, (c) spacing control means for uniformly varying the spacing between the adsorbent plates, the spacing control means cooperating with the plates.

27. An apparatus as claimed in claim 24 in which:

(a) the bed components are substantially rigid and contain porous adsorbent material, (b) sealing means extend between the bed components to direct flow through the components in series, (c) spacing control means for varying spacing between the bed components, the spacing control means cooperating with the bed components.

28. An apparatus as claimed in claim 21 further including:

(a) pressure responsive means for sensing total pressure within the adsorbent bed, (b) coupling means cooperating the pressure sensing means and means to vary flow path volume of the bed, so that the flow path volume is contracted as pressure rises, and is expanded as pressure decreases.

29. An apparatus as claimed in claim 21 further characterized by:

(a) the flow generation means including a first volume displacement means, (b) the second flow generation means including a second flow displacement means, (c) phase control means for coupling the first and second flow generation means so that cyclic displacement of the first flow generation means has a leading phase with respect to cyclic displacement of the second flow generation means, the phase control means cooperating with the means for cyclically varying the flow path volume of the adsorbent bed.

30. An apparatus as claimed in claim 21 in which:

(a) the first flow generation means includes a compressor, (b) the first end of the adsorbent bed is connected the compressor by a feed valve means, (c) the first flow generation means also includes an exhaust valve means connected to the first end of the adsorbent bed.

31. An apparatus as claimed in claim 30 in which:

(a) the compressor is a reciprocating compressor, (b) means for coordinating reciprocation of the compressor and the cyclic pressure fluctuations, so that the reciprocating compressor operates at the same cyclic frequency as the cyclic pressure variations, (c) the feed valve means is a non-return valve.

32. An apparatus as claimed in claim 21 in which:

(a) the first flow generation means includes a vacuum pump connected to the first end of the adsorbent bed by an exhaust valve means.

33. An apparatus as claimed in claim 21 in which:

(a) the second flow generation means is an energy recovery expansion engine,
(b) the expansion engine is connected to the second end of the adsorbent bed by an inlet valve means.

34. An apparatus as claimed in claim 33 in which:
(a) the expansion engine is a reciprocating expansion engine,
and the apparatus further includes:
(b) means for coordinating reciprocation of the expansion engine with the cyclic pressure variations, so that the expansion engine reciprocates at the same frequency as the cyclic pressure variations.

35. An apparatus as claimed in claim 33 in which:
(a) the second flow generation means includes a feed compressor connected by a valve means to the second end of the adsorbent bed.

36. An apparatus as claimed in claim 21 in which:
(a) one flow generation means includes a displacer piston mounted for reciprocation within a cylinder, a first space and a second space being provided on opposite sides of the piston,
(b) the adsorbent bed is mounted on the displacer piston within the housing, the adsorbent bed providing a flow path between the compression space and the expansion space,
(c) a reciprocating power piston cooperates with the working space to change volume and total pressure therein.

37. An apparatus as claimed in claim 24 further including:
(a) an exhaust valve connected to the first end of the adsorbent bed,
(b) means responsive to the spacing between the bed components to actuate the exhaust valve so that the exhaust valve is open when the flow path volume is substantially maximum, and so that the exhaust valve is closed when the flow path volume is less than maximum.

38. An apparatus as claimed in claim 24 in which:
(a) the bed components are annular plates,
(b) the flow channels are gaps between the plates.

39. An apparatus as claimed in claim 38 further characterized by:
(a) a plurality of tension links extending between the plates,
(b) means to rotate the plates relative to each other so as to vary spacing between adjacent plates, the relative rotation and spacing being controlled by tension in the tension links, so as to vary flow path volume.

40. An apparatus as claimed in claim 29 further including:
(a) a first lever means cooperating with the first and second volume displacement means so as to actuate the volume displacement means in cooperation with each other so as to cause flow through the flow path,
(b) a second lever means cooperating with the first and second volume displacements means so as to actuate the volume displacements means so as to change the total volume of working space and thus total pressure within the flow path,
(c) the first and second lever means are the phase control means.

41. Apparatus for converting and transporting thermal energy, the apparatus comprising:
(a) an internal working volume containing a compressible working fluid,
(b) a first volume displacement means maintained at a first temperature,
(c) a second volume displacement means maintained at a second temperature,
(d) a flow path connecting the first and second colume displacement means, and having a flow path volume,
(e) thermal regenerator means in the flow path comprising bed components of material with heat capacity dispersed along the flow path, the bed components being spaced apart to provide flow channels for the flow path,
(f) means to cyclically displace the first and second volume displacement means at a periodic frequency, and at a relative phase so that volume changes in the second volume displacement means have a leading phase relative to volume changes in the first volume displacement means,
(g) means to cyclically vary the spacing of the bed components at the periodic frequency and with a phase such that the flow path volume is relatively reduced when the pressure in the flow path is increased, and the flow path volume is relatively increased when the pressure is reduced,
(h) means to take up heat of compression at substantially the first temperature from adjacent the first volume displacement means,
(i) means to provide heat of expansion at substantially the second temperature to adjacent the second volume displacement means.

* * * * *